US009518642B1

(12) United States Patent
Hirao

(10) Patent No.: US 9,518,642 B1
(45) Date of Patent: Dec. 13, 2016

(54) HUB REDUCTION GEAR OF AN AXLE

(71) Applicant: Meritor Heavy Vehicle Systems Cameri SpA, Cameri (Novara) (IT)

(72) Inventor: Wagner Yukio Hirao, Rochester Hills, MI (US)

(73) Assignee: Meritor Heavy Vehicle Systems Cameri SpA, Cameri (Novara) (IT)

( * ) Notice: Subject to any disclaimer, the term of this patent is extended or adjusted under 35 U.S.C. 154(b) by 0 days.

(21) Appl. No.: 14/719,804

(22) Filed: May 22, 2015

(51) Int. Cl.
| | | |
|---|---|---|
| F16H 1/28 | (2006.01) | |
| F16H 37/08 | (2006.01) | |
| F16H 3/50 | (2006.01) | |
| B60K 17/08 | (2006.01) | |
| B60K 17/16 | (2006.01) | |

(52) U.S. Cl.
CPC ............ *F16H 37/082* (2013.01); *B60K 17/08* (2013.01); *B60K 17/165* (2013.01); *F16H 1/2854* (2013.01); *F16H 3/50* (2013.01)

(58) Field of Classification Search
None
See application file for complete search history.

(56) References Cited

U.S. PATENT DOCUMENTS

| | | | | |
|---|---|---|---|---|
| 1,902,374 A | * | 3/1933 | Pirinoli | F16H 1/2854 416/129 |
| 4,846,008 A | | 7/1989 | Kraus | |
| 5,813,488 A | * | 9/1998 | Weiss | B60K 7/0007 180/65.1 |
| 5,947,855 A | * | 9/1999 | Weiss | B60K 6/36 180/65.25 |
| 6,225,892 B1 | * | 5/2001 | Chene | F16H 57/01 340/438 |
| 6,254,193 B1 | * | 7/2001 | Bowman | B60B 11/02 180/371 |
| 9,109,635 B2 | | 8/2015 | Boothby et al. | |

FOREIGN PATENT DOCUMENTS

| | | | |
|---|---|---|---|
| DE | 3536195 A1 | | 4/1987 |
| FR | 2922618 A3 | | 4/2009 |
| GB | 01443880 a | * | 7/1976 |

OTHER PUBLICATIONS

European Patent Office, Extended European Search Report for the corresponding European Patent Application No. 16169246.2 dated Sep. 27, 2016.

* cited by examiner

*Primary Examiner* — Justin Holmes
(74) *Attorney, Agent, or Firm* — Brooks Kushman P.C.

(57) ABSTRACT

A hub reduction gear of a drive axle and a method of providing a hub reduction gear. The hub reduction gear may include a plurality of bevel planet gears in mesh with a bevel sun gear, a planet carrier adapted to drive a vehicle wheel; and an internal bevel gear annulus in mesh with the bevel planet gears and adapted for connection to an axle side shaft casing.

21 Claims, 4 Drawing Sheets

| Example | Reduction Ratio R | $N_A$ | $N_P$ | $N_S$ | $SA_{SP}$ | $SA_{PA}$ | $PA_A$ | $PA_P$ | $PA_S$ |
|---|---|---|---|---|---|---|---|---|---|
| 1 | 3 : 1 | 40 | 20 | 20 | 60° | 120° | 90° | 30° | 30° |
| 2 | 3 : 1 | 40 | 15 | 20 | 48.19° | 131.81° | 111.37° | 20.44° | 27.75° |
| 3 | 3 : 1 | 40 | 30 | 20 | 70.53° | 109.47° | 66.16° | 43.31° | 27.21° |
| 4 | 6 : 1 | 70 | 30 | 14 | 21.039° | 158.961° | 144.578° | 14.383° | 6.657° |
| 5 | 4.5 : 1 | 70 | 30 | 20 | 33.557° | 146.433° | 126.213° | 20.230° | 13.328° |

Fig-6

HUB REDUCTION GEAR OF AN AXLE

TECHNICAL FIELD

This invention relates to a hub reduction gear of an axle, in particular an axle of a heavy vehicle such as a truck.

BACKGROUND

In order to effectively harness the output of an internal combustion engine, motor vehicles are typically provided with a gear transmission having a plurality of speed ratios. In use, these speed ratios are selected one by one in a progressive manner, and allow a vehicle to be provided with a desirable balance of acceleration, cruising speed and fuel economy. Typically a driven axle of a heavy vehicle also provides a fixed speed ratio whereby the input (propeller shaft) speed is reduced via a pinion and crown wheel, so that the output (side shaft) speed is lower; this further ratio reduction may be in the range 3:1 to 5:1.

In some cases, the fixed ratio speed reduction provided in the rear axle is insufficient, particularly in the case of heavy vehicles that are required to move slowly in a controllable manner within a useful range of engine speed. Generally speaking it is not desirable to provide a greater speed reduction at the crown wheel and pinion, because either the pinion becomes too small to transmit the required torque, or the crown wheel is so large that ground clearance is insufficient.

In order to address this problem it has been proposed to provide hub reduction gearing at the wheel ends of an axle. Typically an epicyclic gear set is incorporated in each wheel hub, whereby the sun gear is driven by the respective side shaft, the annulus is connected to the axle (side shaft) casing, and the planet carrier is coupled to the rotatable output components, namely the wheel hub, brake drum and road wheel.

A compact hub reduction gear can be incorporated at each end of an axle, in particular where double wheels are provided, and may also allow the crown wheel and pinion ratio to be reduced, thus permitting a more robust pinion and a smaller diameter crown wheel.

The epicyclic gears of a hub reduction gear may comprise cylindrical gears. This arrangement is axially compact but is radially confined by the aperture in the center of the corresponding vehicle wheel. For this reason, and also to ensure that pinion gears have adequate strength, the range of hub reduction ratios available is approximately in the range 3:1 to 6:1.

An alternative cylindrical gear arrangement, with the annulus driven by the respective side shaft, can give a ratio range of about 1.2:1 to 1.5:1. Thus cylindrical gears do not provide a continuous spread of hub reduction ratios.

It is also possible to provide a hub reduction gear with conventional bevel gears. This arrangement is radially compact as compared with cylindrical gears, but takes up more axial space. For practical reasons of pinion size, the available range of hub reduction ratios using conventional bevel gears is about 1.5:1 to 3:1.

It will be appreciated from the foregoing that the full range of desirable speed reduction ratios cannot be provided by either cylindrical gears or bevel gears. On the other hand it is not desirable to have two different kinds of hub reduction gear with substantially different radial and axial space constraints.

Accordingly it would be advantageous to expand the ratio range of one or other of the known hub reduction gears in order to facilitate drive axles which have more components in common.

SUMMARY

According to the invention there is provided a hub reduction gear of an axle, and comprising a bevel sun gear adapted to be driven by an axle side shaft, a plurality of bevel planet gears in mesh with the bevel sun gear, a planet carrier adapted to drive a vehicle wheel, and an internal bevel gear annulus in mesh with the bevel planet gears and adapted for connection to an axle side shaft casing.

By internal bevel gear, we mean an internally dished gear in which a radially outer tooth portion is relatively higher than a radially inner tooth portion.

The use of an internal bevel gear allows an increase in the range of hub reduction bevel gear ratios to 6:1, which ratio range could previously only be provided by cylindrical gears. Accordingly the full range of bevel gear hub reduction ratios, incorporating the invention, is about 1.5:1 to 6:1.

Advantageously the bevel gears have straight teeth, and can thus be formed by precision forging.

Other features of the invention will be apparent from the accompanying claims.

BRIEF DESCRIPTION OF THE DRAWINGS

Other features of the invention will be apparent from the following description of several embodiments illustrated by way of example only in the accompanying drawings, in which:

FIG. 6 is a comparative table of some different reduction ratios achievable by use of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
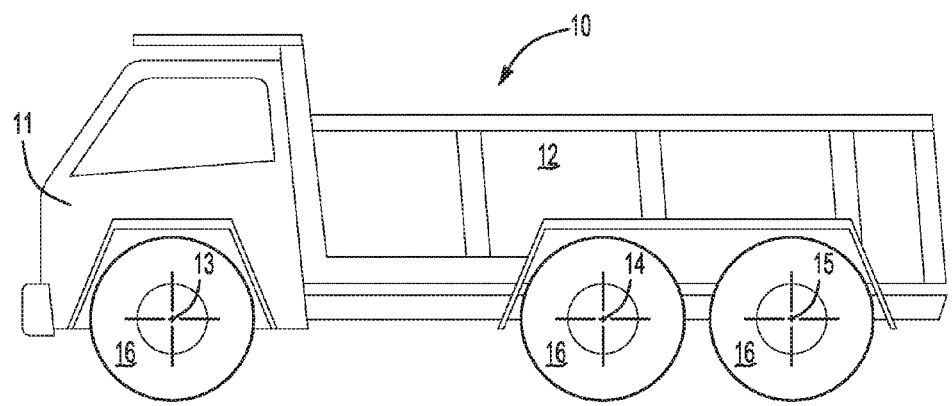
FIG. 1 illustrates an exemplar off-highway truck, in side elevation.

FIG. 1 illustrates an exemplar off-highway quarry truck 10 of a kind for which a hub reduction gear may be provided. The truck comprises a driver's cab 11, an open body 12 for stone or other quarry material, a front steering axle 13, two rear drive axles 14, 15, and vehicle wheels 16. Such a truck is typically required to carry heavy loads over rough terrain at low speeds, and for this reason engine speed must be reduced by suitable gearing to achieve the desired wheel speed.

The truck 10 may typically use a conventional internal combustion engine and change speed gear transmission with drive output to rear axles via an open propeller shaft. At the rear axle, drive is divided to the rear wheels via a conventional differential gear incorporating speed ratio reduction via a crown wheel and pinion. To achieve a greater speed ratio reduction, a reduction gear is provided in each wheel hub.

Other kinds of truck and wheeled vehicle may also incorporate hub reduction gears.

Figure 2:
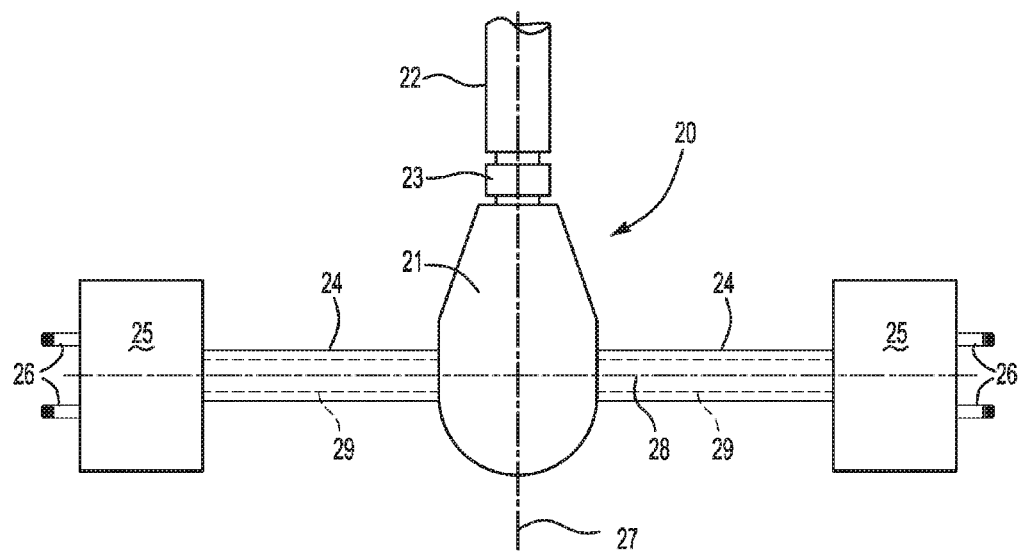
FIG. 2 illustrates in plan an exemplar drive axle for the truck of FIG. 1.

FIG. 2 illustrates a typical drive axle 20 in plan. An axle casing 21 incorporates a conventional differential gear with crown wheel and pinion (not shown). Drive input is via a propeller shaft 22 and universal joint 23, which provides for axle suspension movement relative to the vehicle chassis.

Opposed side shaft housings 24, which may also be referred to as side shaft casings, may incorporate and support respective rotatable side shafts 29, which terminate in respective wheel hubs. Each hub typically comprises a brake drum 25 from which threaded studs 26 protrude for attachment of vehicle wheels 16.

Typically the drive axis 27 of the propeller shaft on the longitudinal axis of the vehicle, and orthogonal to the axis of rotation 28 or drive axis of the drive axle 20. The side shafts are usually of the same axial length, but in some circumstances the axle casing may be offset to one side.

Figure 3:
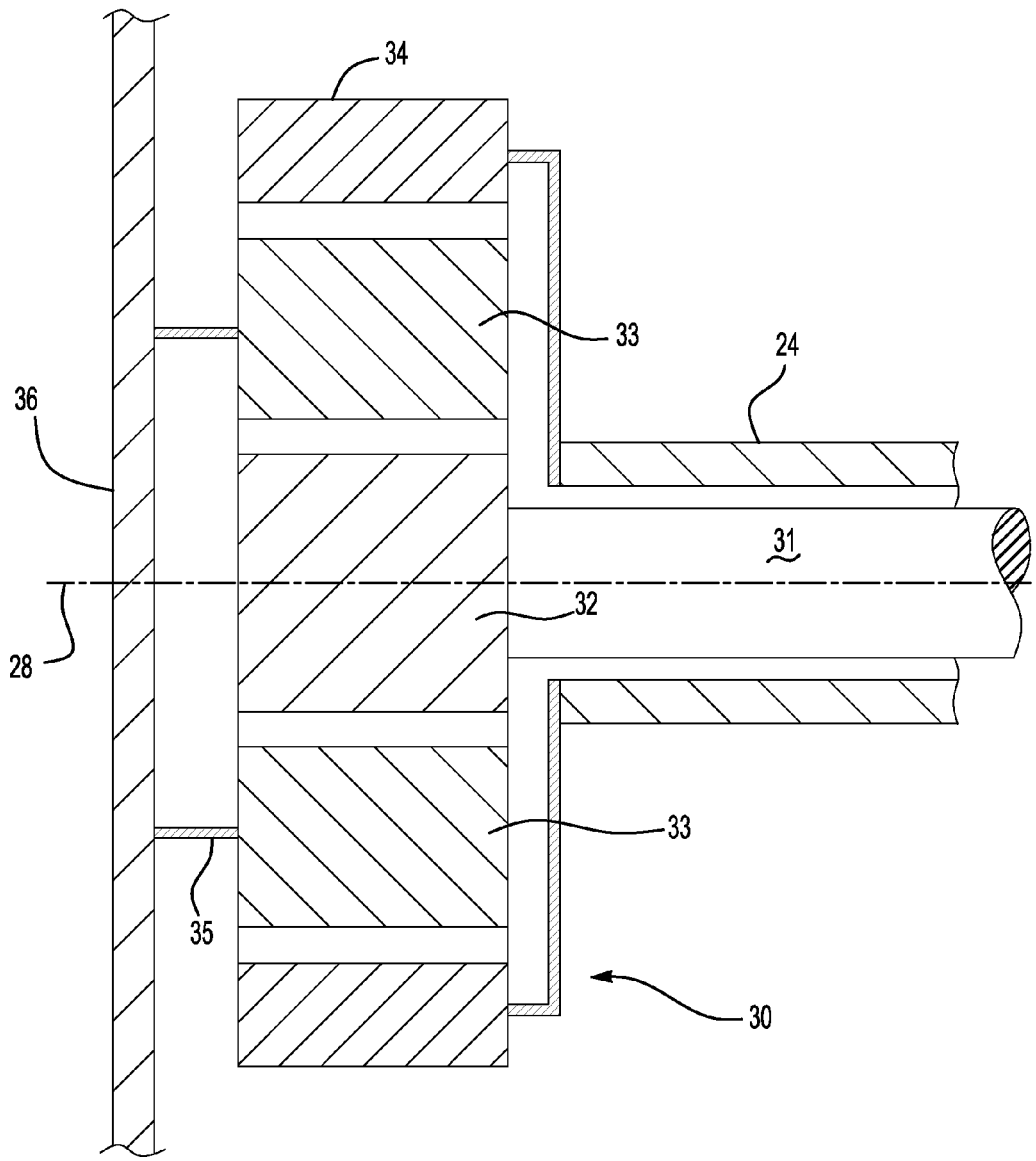
FIG. 3 illustrates in axial section a schematic representation of a prior art hub reduction gear incorporating cylindrical gear wheels.

FIG. 3 illustrates schematically a prior art hub reduction gear 30 comprising cylindrical gear wheels. A side shaft housing 24, forming one side of a drive axle, contains within a rotatable side shaft 31 supported by bearings (not shown). The axis of rotation 28 of the side shaft 31 is illustrated.

A cylindrical sun gear 32 is rotatable with the side shaft 31, and meshes conventionally with a plurality of equispaced planet wheels 33, which in turn mesh with a cylindrical ring gear or annulus 34. The annulus 34 is fixed to the side shaft housing 24 and thus relatively unmovable.

The usual planet carrier 35, on which the planet wheels 33 are rotatable, is coupled to an output element 36 of the reduction gear. The output element 36 is typically a vehicle brake drum or other rotatable hub member which is in turn connected to a driving wheel of the vehicle.

In use rotation of the side shaft 31 and sun gear 32 causes the planet wheels 33 to rotate within the (fixed) annulus 34 and thereby to turn the planet carrier 35 at a relatively reduced speed. Cylindrical hub reduction gears allow a ratio reduction in the range 3:1 to 6:1, but ratios of less than 3:1 are not possible if gear tooth strength is to be sufficient.

As noted above, bevel gear hub reduction is also known, but restricted to a ratio spread in the approximate range 1.5:1 to 3:1.

Figure 4:
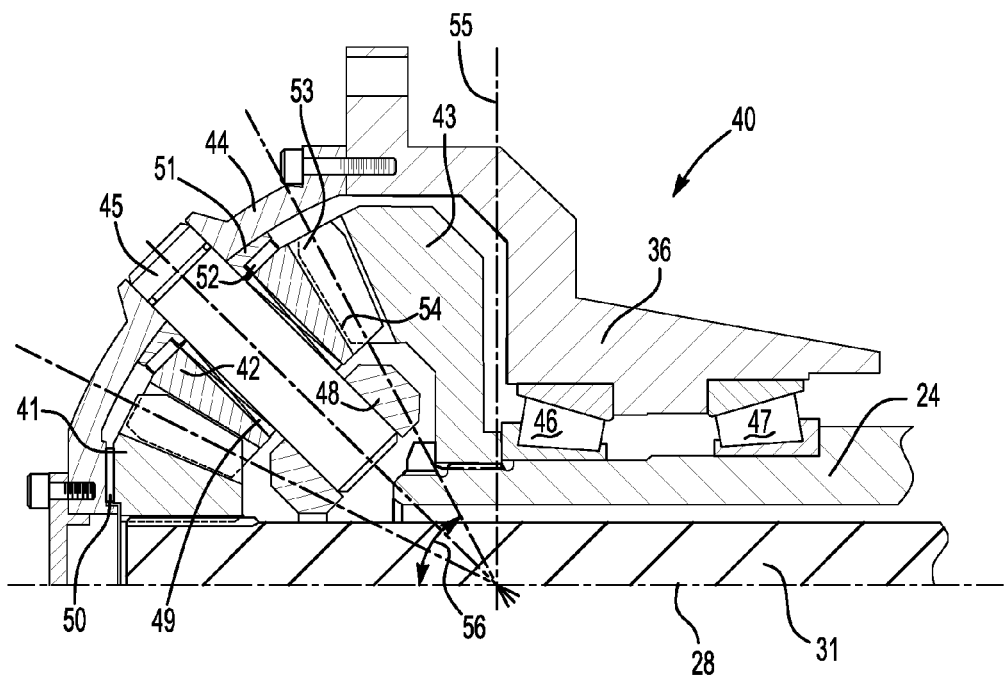
FIG. 4 illustrates in axial section a hub reduction gear according to the invention.

FIG. 4 illustrates a hub reduction gear 40 according to the invention. A side shaft housing 24 of a drive axle contains within a rotatable side shaft 31 supported by bearings (not shown). The axis of rotation 28 is illustrated.

A bevel sun gear 41 is rotatable with the side shaft 31 and meshes with one of a plurality of equispaced bevel planet wheels 42, which in turn mesh with a bevel ring gear or annulus 43. The annulus 43 is fixed to the side shaft housing 24, and thus relatively unmovable.

The usual planet carrier 44, in which the planet wheels 42 are rotatable via planet pins 45, is coupled to an output element 36, such as a wheel hub which is supported for rotation on the side shaft housing 24 by taper roller bearings 46, 47. The wheel hub is in use coupled to a vehicle driving wheel or wheels.

Also illustrated in FIG. 4 are the planet pin support 48, a planet pin needle roller bearing 49, a sun gear thrust bearing 50, a planet pinion thrust bearing 51 and a planet pinion thrust washer 52. Such support and thrust bearings may be required in the prior art example of FIG. 1, but are omitted to improve clarity.

The bevel gear reduction gear of FIG. 2 is of relatively lesser diameter than the cylindrical reduction gear of FIG. 1, but relatively longer in the direction of the axis of rotation 28.

In use, rotation of the side shaft 31 and sun gear 41 causes the planet wheels 42 to rotate within the (fixed) annulus 43, and thereby to turn the planet carrier 44 at a relatively reduced speed.

The annulus 43 is an internal bevel gear, in which the radially outermost portion 53 of each tooth has a greater height than the radially innermost portion 54 of each tooth, thus giving the bevel gear a dished appearance from the gear tooth side, by reference to the plane of rotation 55.

In an embodiment of the invention, each bevel gear tooth is straight, that is to say each tooth extends radially at the dish angle 56; such a tooth form may be forged and/or milled with greater ease than a corresponding arcuate tooth, as may for example be provided on a helical gear wheel. It will be understood that if a straight tooth form is selected for the annulus 43, the sun gear 41 and each pinion are required to have a corresponding tooth form for effective gear tooth meshing.

The internal bevel gear annulus 43 permits a wider range of hub reduction ratios than previously available from an external bevel gear annulus.

In the case of a hub reduction gear in which the sun gear is driving, the annulus is fixed, and the output is from the planet carrier, the reduction ratio is determined by the formula:

$$\text{Ratio} = 1 + N_A/N_S$$

where:

$N_A$ is the number of teeth on the annulus (ring) gear, and $N_S$ is the number of teeth on the sun wheel.

The number of teeth on the planet wheel $N_P$ is selected according to geometry of the reduction gear, but does not affect gear ratio as such.

Example 1

A reduction ratio of 3:1 can be achieved using bevel gears having the following number of teeth:
$N_A=40$
$N_P=20$
$N_S=20$
In this case:
the shaft angle between the rotational axis of the sun gear and that of the planet pinions $SA_{SP}=60°$;
the shaft angle between the rotational axis of the annulus and the planet pinions $SA_{AP}=120°$;
the pitch angle of the sun gear $PA_S=30°$;
the pitch angle of the planet pinions $PA_P=30°$; and
the pitch angle of the annulus $PA_A=90°$.

Example 2

A reduction ratio of 3:1 can also be achieved using bevel gears having the following number of teeth:

$N_A$=40
$N_P$=15
$N_S$=20
In this case:
$SA_{SP}$=48.19°
$SA_{AP}$=131.81°
$PA_S$=27.75°
$PA_P$=20.44°
$PA_A$=111.37°

Example 3

A further example of a reduction ratio of 3:1 uses bevel gears with the following number of teeth:
$N_A$=40
$N_P$=30
$N_S$=20
In this case:
$SA_{SP}$=70.53°
$SA_{AP}$=109.47°
$PA_S$=27.21°
$PA_P$=43.31°
$PA_A$=66.16°

Examples 1-3 illustrate that a desired reduction ratio can be achieved in a number of ways, according to space constraints imposed by the available design envelope within which the hub reduction gear is to be contained.

Example 4

A reduction ratio of 6:1 can be achieved by using bevel gears having the following number of teeth:
$N_A$=70
$N_P$=30
$N_S$=14
In this case:
$SA_{SP}$=21.039°
$SA_{PA}$=158.961°
$PA_S$=6.657°
$PA_P$=14.383°
$PA_A$=144.578°

Figure 5:
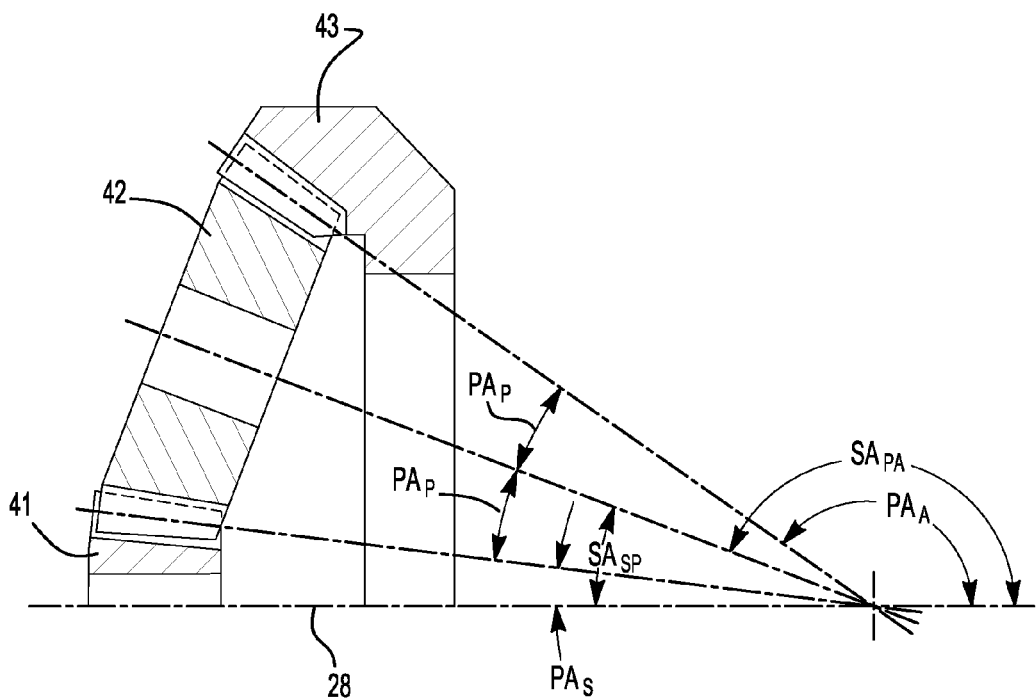
FIG. 5 illustrates another hub reduction gear according to the invention.

FIG. 5 corresponds to FIG. 4, and illustrates the arrangement of Example 4, giving a reduction ratio of 6:1; other axle components are omitted for reasons of clarity, but common reference numerals are employed to identify equivalent parts.

Example 5

A reduction ratio of 4.5:1 can be achieved by using bevel gears having the following number of teeth:
$N_A$=70
$N_P$=30
$N_S$=20
In this case:
$SA_{SP}$=33.557°
$SA_{PA}$=146.443°
$PA_S$=13.328°
$PA_P$=20.230°
$PA_A$=126.213°

Examples 4 and 5 illustrate that a range of hub reduction ratios can be achieved, according to the invention.

The values of Examples 1-5 are summarized in FIG. 6, which is a comparative table of reduction ratio (R), number of annulus teeth ($N_A$); number of planet teeth ($N_P$); number of sun teeth ($N_S$); shaft angle between sun and planet ($SA_{SP}$); shaft angle between planet and annulus ($SA_{PA}$); pitch angle of annulus ($PA_A$); pitch angle of planet ($PA_P$) and pitch angle of sun ($PA_S$).

Other ratios can of course be devised, it being understood that each of the gear wheels must have a whole number of teeth.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle comprising:
a hub reduction gear that includes:
a bevel sun gear that is rotatable about an axis and is adapted to be driven by an axle side shaft;
a plurality of bevel planet gears in mesh with the bevel sun gear;
a planet carrier adapted to drive a vehicle wheel; and
an internal bevel gear annulus in mesh with the bevel planet gears and adapted for connection to an axle side shaft casing, wherein the internal bevel gear annulus is an internal gear having teeth that face toward the axis in which a radially outermost potion of each tooth is disposed further from the axis and from a plane of rotation than a radially innermost portion of each tooth, wherein the plane of rotation is disposed perpendicular to the axis and is disposed proximate a side of the internal bevel gear annulus that is disposed opposite the teeth.

2. The drive axle of claim 1 having a reduction ratio in a range of 3:1 to 6:1.

3. The drive axle of claim 1 wherein the plurality of bevel planet gears has straight teeth.

4. The drive axle of claim 3 wherein the plurality of bevel planet gears has a plurality of teeth in a range of 15-30.

5. The drive axle of claim 1 wherein the bevel sun gear has straight teeth.

6. The drive axle of claim 5 wherein the bevel sun gear has a plurality of teeth in a range of 14-20.

7. The drive axle of claim 1 wherein the internal bevel gear annulus has straight teeth.

8. The drive axle of claim 7 wherein the internal bevel gear annulus has a plurality of teeth in a range of 40-70.

9. The drive axle of claim 1 wherein teeth of the bevel sun gear, plurality of bevel planet gears, and internal bevel gear annulus are forged.

10. The drive axle of claim 1 wherein a pitch angle of the bevel sun gear is in a range of 5-30°.

11. The drive axle of claim 1 wherein a pitch angle of the plurality of bevel planet gears is in a range of 20-45°.

12. The drive axle of claim 1 wherein a pitch angle of the internal bevel gear annulus is in a range of 90.01°-150°.

13. The drive axle of claim 1 further comprising a second axle side shaft disposed opposite the axle side shaft, wherein the axle side shaft is connected to the bevel sun gear of the hub reduction gear and the second axle side shaft is connected to a sun gear of a second hub reduction gear and a first side shaft housing that is connected to the internal bevel gear annulus, and a second side shaft housing that is disposed opposite the first side shaft housing and is connected to a second internal bevel gear annulus of the second hub reduction gear.

14. The drive axle of claim 13 further comprising a differential gear between the axle side shaft and the second axle side shaft.

15. The drive axle of claim 13 further comprising a first brake drum connected to the planet carrier of the hub reduction gear and a second brake drum connected to a planet carrier of the second hub reduction gear.

16. A method of providing a hub reduction gear for a vehicle drive axle, the hub reduction gear having a ratio selectable in a range of 1.5:1 to 6:1, the method comprising:
providing a bevel sun gear that is rotatable about an axis;
providing a plurality of bevel gears for each ratio in the range, wherein the plurality of bevel gears mesh with the bevel sun gear and are rotatable about planet gear axes that are disposed at an angle that is non-perpendicular and non-parallel with respect to the axis, the plurality of bevel gears including an internal bevel gear annulus for ratios in the range of 3:1 to 6:1, wherein the internal bevel gear annulus is an internal gear having teeth that face toward the axis in which a radially outermost potion of each tooth is disposed further from the axis and from a plane of rotation than a radially innermost portion of each tooth, wherein the plane of rotation is disposed perpendicular to the axis.

17. The method of claim 16 wherein the plurality of bevel gears have straight teeth.

18. The method of claim 17 wherein the straight teeth are radial.

19. The method of claim 17 and comprising direct forging of the teeth of the plurality of bevel gears.

20. The method of claim 16 wherein the vehicle drive axle includes opposing side shafts, each side shaft being connected to a bevel sun gear of a respective hub reduction gear.

21. A drive axle comprising:
a hub reduction gear that includes:
a bevel sun gear that is rotatable about an axis and is driven by an axle side shaft that extends through a side shaft housing;
a planet pin support that is disposed on the axle side shaft between the bevel sun gear and the side shaft housing, wherein the planet pin support is spaced apart from the side shaft housing and the bevel sun gear;
a plurality of bevel planet gears in mesh with the bevel sun gear wherein the plurality of bevel planet gears are rotatable about planet gear axes that are disposed in a non-perpendicular angle with respect to the axis;
a planet carrier adapted to drive a vehicle wheel; and
an internal bevel gear annulus in mesh with the bevel planet gears and adapted for connection to an axle side shaft casing, wherein the internal bevel gear annulus is an internal gear having teeth that face toward the axis in which a radially outermost potion of each tooth is disposed further from the axis and from a plane of rotation than a radially innermost portion of each tooth, wherein the plane of rotation is disposed perpendicular to the axis.

\* \* \* \* \*

UNITED STATES PATENT AND TRADEMARK OFFICE
CERTIFICATE OF CORRECTION

PATENT NO.        : 9,518,642 B1
APPLICATION NO.   : 14/719804
DATED             : December 13, 2016
INVENTOR(S)       : Hirao Page 1 of 1

It is certified that error appears in the above-identified patent and that said Letters Patent is hereby corrected as shown below:

In the Claims

Column 6, Line 28, Claim 1:
After "in which a radially outermost"
Delete "potion" and
Insert -- portion --.

Column 7, Line 21, Claim 16:
After "in which a radially outermost"
Delete "potion" and
Insert -- portion --.

Column 8, Line 24, Claim 21:
After "in which a radially outermost"
Delete "potion" and
Insert -- portion --.

Signed and Sealed this
Fourteenth Day of March, 2017

Michelle K. Lee
*Director of the United States Patent and Trademark Office*